United States Patent Office 3,549,700
Patented Dec. 22, 1970

3,549,700
N-PHENYL SULFENAMIDES
Joseph G. E. Fenyes, Oakland, Calif., assignor to Chevron Research Company, San Francisco, Calif., a corporation of Delaware
No Drawing. Continuation-in-part of application Ser. No. 545,887, Apr. 28, 1966. This application Jan. 30, 1969, Ser. No. 795,360
Int. Cl. C07c *145/00*
U.S. Cl. 260—551     4 Claims

ABSTRACT OF THE DISCLOSURE

Compounds of the formula

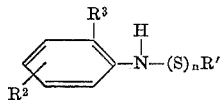

wherein $R^2$ is a cyano or nitro group in the para or meta position or a trifluoromethyl group, $R^3$ is hydrogen or alkyl of 1 to 3 carbon atoms when $R^2$ is cyano or nitro and $R^3$ is hydrogen when $R^2$ is trifluoromethyl, $R'$ is a polyhaloalkyl group having 1 to 2 carbon atoms and 3 to 5 halogens of atomic number 17 to 35, at least one of the halogens being bonded to the α carbon atom, a polyhalovinyl group wherein the halogens are of atomic number 17 to 35 or a 1-halo-1-nitroalkyl group having 2 to 4 carbon atoms wherein the halogen has an atomic number of 17 to 35 and $n$ is 1 or 2 when $R'$ is said polyhaloalkyl group and $n$ is 1 when $R'$ is said 1-halo-1-nitroalkyl group or said polyhalovinyl group. Compounds having the above formula are fungicidal.

CROSS REFERENCE TO RELATED APPLICATIONS

This application is a continuation-in-part of copending application Ser. No. 545,887, filed Apr. 28, 1966, now abandoned.

FIELD OF INVENTION

This invention pertains to unique sulfenamides. More particularly, it relates to new N-phenyl sulfenamides and their use as pesticides.

INVENTION DESCRIPTION

The sulfenamides of this invention have the general formula:

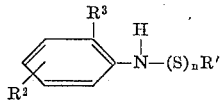

in which $R^2$ is a cyano or nitro group in the para or meta (3 or 5) position or a trifluoromethyl group in position 3–6 (ortho, para or meta) and $R^3$ is hydrogen or alkyl of 1 to 3 carbon atoms when $R^2$ is cyano or nitro and $R^3$ is hydrogen when $R^2$ is trifluoromethyl, $R'$ is a polyhaloalkyl group having 1 to 2 carbon atoms and 3 to 5 halogens of atomic number 17 to 35, preferably 17, at least one of said halogens being bonded to the "1" (alpha) carbon atom, a polyhalovinyl group wherein the halogens are of atomic number 17 to 35, preferably 17, or a 1 halo-1-nitroalkyl group having 2 to 4 carbon atoms, wherein the halogen is of atomic number 17 to 35, preferably 17, and $n$ is 1 or 2 when $R'$ is said polyhaloalkyl group, and $n$ is 1 when $R_2$ is said 1-halo-1-nitroalkyl group or said polyhalovinyl group. Preferably $R^3$ is hydrogen, $R^2$ is a cyano or nitro group in the para or meta position, $n$ is 1 and $R'$ is a polyhaloethyl group having 3–5 halogens of atomic number 17 to 35, at least one of which is bonded to the alpha carbon atom. Even more preferably $R^3$ is hydrogen, $R^2$ is a p-nitro group, $R'$ is 1,2,2,2-tetrachloroethyl and $n$ is 1.

Examples of compounds having the above general formula are:

N-p-nitrophenyl-trichloromethane sulfenamide,
N-m-cyanophenyl-trichloromethane sulfenamdie,
N-(2-methyl-5-nitrophenyl)-tribromomethane sulfenamide,
N-p-cyanophenyl-pentachloroethane thiosulfenamide,
N-m-nitrophenyl-1-chloro-2,2-dibromoethane sulfenamide,
N-(2-methyl-4-nitrophenyl)-1-bromo-1,2,2-trichloroethane sulfenamide,
N-(3-cyano-2-methylphenyl)-trichloromethane thiosulfenamide,
N-p-trifluoromethylphenyl-1,1,2,2-tetrachloroethane sulfenamide,
N-5-trifluoromethylphenyl-pentachloroethane sulfenamide,
N-(5-cyano-2-ethylphenyl)-1,2,2,2-tetrachloroethane sulfenamide,
N-p-nitrophenyl-1,1,2,2-tetrabromoethane sulfenamide,
N-(3-nitro-2-propylphenyl)-1,1,2-trichloroethane sulfenamide,
N-p-cyanophenyl-trichlorovinyl sulfenamide,
N-m-nitrophenyl-2,2-dichlorovinyl sulfenamide,
N-(4-cyano-2-methylphenyl)-2,2-dibromovinyl sulfenamide,
N-3-trifluoromethylphenyl-trichlorovinyl sulfenamide,
N-p-nitrophenyl-1,2-dichlorovinyl sulfenamide,
N-m-cyanophenyl-1-chloro-1-nitroethane sulfenamide,
N-p-nitrophenyl-1-chloro-1-nitropropane sulfenamide,
N-(2-methyl-5-nitrophenyl)-1-bromo-1-nitropropane sulfenamide,
N-p-cyanophenyl-1-chloro-1-nitrobutane sulfenamide,
N-p-trifluoromethylphenyl-1,1,2,2-tetrachloroethane sulfenamide,
N-o-trifluoromethylphenyltrichlorovinyl sulfenamide and
N-m-trifluoromethylphenyl-1-chloro-1-nitroethane sulfenamide.

These sulfenamides may be made by reacting m- or p-nitroaniline, m- or p-cyanoaniline or a trifluoromethylaniline with a polyhaloalkylsulfenyl or thiosulfenyl halide, polyhalovinylsulfenyl halide or 1-halo-1-nitroakylsulfenyl halide.

Polyhaloalkylthiosulfenyl halides are disclosed in U.S. Pat. No. 3,234,272. Polyhaloethylsulfenyl halides are disclosed in U.S. Pats. Nos. 3,178,447 and 3,200,146. Polyhalovinylsulfenyl halides are discolsed in U.S. Pats. Nos. 3,296,302 and 3,155,720. 1-halo-1-nitroalkylsulfenyl halides and their method of preparation are disclosed in applicant's applications Ser. Nos. 442,812, filed Mar. 25, 1965, now abandoned, and 711,510, filed Mar. 8, 1968, the texts of which are hereby incorporated by reference. Sulfenyl chlorides are preferred. Alternatively, the polyhalovinyl sulfenamides may be made by dehydrohalogenating agent such as tertiary amines, strong alkalis or alkali carbonates may be used.

The sulfenyl halide-aniline reaction may be carried out neat or in the presence of aqueous solvents such as chloroform-water, benzene-water, toluene-water, ether-water and hexane-water. Temperatures ranging from 0 to 50° C. and sub- or superatmospheric pressures may be used if desired. However, the reaction may be conviently done at ambient temperature and atmospheric or autogenous pressures. Stoichiometric or excess proportions of sulfenyl halide, preferably excess, will be used.

EXAMPLES

The following examples illustrate the novel sulfenamides of this invention and methods by which they may be made. These examples are offered only to illustrate these compounds and methods; they are not intended to limit the invention described and claimed herein.

Example 1

27.6 g. p-nitroaniline was suspended in 150 ml. chloroform in a flask. 125 ml. water and 40 ml. 1,2,2,2-tetrachloroethylsulfenyl chloride were added to this mixture. The combined mixture was stirred at room temperature for 5½ hrs. and then allowed to stand overnight. The mixture was filtered and the solids were washed consecutively with dilute aqueous HCl, water and mixed hexanes. 51.5 g. N - p - nitrophenyl-1,2,2,2,2-tetrachloroethane sulfenamide was recovered. This compound was observed as a yellow-brown solid which melted at 129–132° C. Its analysis was: (wt. percent) Cl—calc'd 42.20, found 42.08; S—calc'd 9.54, found 9.57.

Example 2

11.8 g. p-cyanoaniline and 100 ml. $CHCl_3$ were put in a vessel. To this solution 100 ml. water and 20 ml. 1,1,2,2-tetrachloroethylsulfenyl chlorides were added. The mixture was stirred at room temperature for 5–6 hrs. and then filtered. The solids were worked up by dissolving them in $CHCl_3$ and stripping off the solvent. The filtrate was put in a separatory funnel and the aqueous layer was removed. The organic layer was dried over $MgSO_4$ and filtered. The solvent was stripped from it. The residue was added to the other solids giving 21.9 g. N-p-cyanophenyl-1,1,2,2-tetrachloroethane sulfenamide. It melted at 135–136° C. and had the following weight percent analysis: Cl—calc'd 44.87, found 44.55; S—calc'd 9.74, found 10.18.

Example 3

6.9 g. of m-nitroaniline and 50 ml. $CHCl_3$ were put in a vessel. To this solution, 50 ml. water and 8.0 ml. 1-chloro-1-nitroethylsulfenyl chloride were added. The combined mixture was stirred for 6–7 hrs. and then allowed to stand overnight. It was then filtered and the solids were washed consecutively with hexane, dilute HCl and water. The solids were washed again with dilute HCl and $H_2O$ and then dried. 6.2 g. of N-m-nitrophenyl-(1-chloro-1-nitroethane) sulfenamide was obtained. It melted at 108–110° C. with decomposition. Its weight percent analysis was: Cl—calc'd 13.44, found 13.58; S—calc'd 12.15, found 11.5.

Example 4

11.4 g. of N-m-nitrophenyl-1,1,2,2-tetrachloroethane sulfenamide and 150 ml. ether were put in a vessel. A solution of 1.9 g. potassium hydroxide in 100 ml. methanol was added dropwise to the sulfenamide-ether mixture. A precipitate formed. The combined mixture was filtered and the solvent was stripped off the filtrate. The stripped filtrate was distilled to 60° C., 0.5 mm. Hg. 6.0 g. of N-m-nitrophenyl-trichlorovinyl sulfenamide were recovered. Its structure was verified by infrared analysis.

Example 5

6.9 g. p-nitroaniline and 50 ml. of a $CHCl_3$-water mixture were put in a vessel. 10 ml. of trichloromethylthiosulfenyl chloride was added to the mixture and the combined mixture was stirred overnight. It was then filtered and washed consecutively with dilute HCl, water and hexane. 2.2 g. of N-p-nitrophenyl-trichloromethane thiosulfenamide were obtained. Its weight percent analysis was: Cl—calc'd 33.28, found 29.8; S—calc'd 20.06, found 21.34.

Other sulfenamides within this invention were made using methods analogous to those of Examples 1–5. For convenience these compounds with their analyses are tabulated below.

TABLE I

| Compound | Chlorine Calculated | Chlorine Found | Sulfur Calculated | Sulfur Found | Melting point, °C. |
|---|---|---|---|---|---|
| N-p-nitrophenyl-1,1,2,2-tetrachloroethane sulfenamide | 42.21 | 40.80 | 9.54 | 9.94 | 127–129 |
| N-p-nitrophenyl-trichloromethane sulfenamide | 36.99 | 37.9 | 11.15 | 10.9 | 150–152 |
| N-m-nitrophenyl-1,1,2,2-tetrachloroethane sulfenamide | 42.21 | 41.25 | 9.54 | 9.57 | 104–106 |
| N-p-cyanophenyl-1,1,2,2-tetrachloroethane sulfenamide | 44.87 | 44.40 | 10.14 | 10.18 | 135–136 |
| N-m-nitrophenyl-trichloromethane sulfenamide | 36.98 | 35.45 | 11.15 | 12.30 | 99–102 |
| N-p-cyanophenyl-pentachloroethane sulfenamide | 50.58 | 49.00 | 9.14 | 9.40 | 140–142 |
| N-m-nitrophenyl-1,2,2,2-tetrachloroethane sulfenamide | 42.21 | 44.00 | 9.54 | 9.16 | 106–107 |
| N-m-nitrophenyl-pentachloroethane sulfenamide | 47.85 | 45.41 | 8.65 | 8.38 | 103–105 |
| N-p-cyanophenyl-1,2,2,2-tetrachloroethane sulfenamide | 44.87 | 44.50 | 10.14 | 9.69 | 150–151 |
| N-(2-methyl-5-nitrophenyl)-1,1,2,2-tetrachloroethane sulfenamide | 40.55 | 40.75 | 9.16 | 9.07 | 113–116 |
| N-(2-methyl-4-nitrophenyl)-1,1,2,2-tetrachloroethane sulfenamide | 40.55 | 38.30 | 9.16 | 8.33 | 104–109 |
| N-(2-methyl-4-nitrophenyl)-1,2,2,2-tetrachloroethane sulfenamide | 40.55 | 40.35 | 9.16 | 9.38 | 107–111 |
| N-(2-methyl-5-nitrophenyl)-1,2,2,2-tetrachloroethane sulfenamide | 40.55 | 40.05 | 9.16 | 9.39 | 102–104 |
| N-(2-methyl-5-nitrophenyl)-trichloromethane sulfenamide | 35.27 | 33.60 | 10.63 | 11.77 | 145–148 |
| N-p-nitrophenyl-trichloromethane thiosulfenamide | 33.28 | 34.2 | 20.06 | 19.87 | 112–115 |
| N-m-nitrophenyl-trichloromethane thiosulfenamide | 33.28 | 33.95 | 20.06 | 21.18 | 110–111 |
| N-p-cyanophenyl-trichloromethane thiosulfenamide | 35.54 | 36.35 | 21.43 | 21.45 | 144–145 |
| N-p-nitrophenyl-trichlorovinyl sulfenamide | 35.51 | 33.13 | 10.70 | 9.95 | 105–109 (dec.) |
| N-(2-methyl-5-nitrophenyl)-trichlorovinyl sulfenamide | 33.91 | 33.5 | 10.22 | 9.84 | 90–91 |
| N-p-cyanophenyl-trichlorovinyl sulfenamide | 38.05 | 37.47 | 11.47 | 11.00 | 112–115 |
| N-o-trifluoromethylphenyl-1,2,2,2-tetrachloroethane sulfenamide | *11.2 | *12.42 | 8.93 | 9.63 | 57–63 |
| N-o-trifluoromethylphenyl-1,2,2-trichloroethane sulfenamide | 32.76 | 34.75 | 9.87 | 10.44 | |
| N-p-trifluoromethylphenyl-1,2,2-trichloroethane sulfenamide | 32.76 | 34.02 | 9.87 | 10.27 | |
| N-m-trifluoromethylphenyl-1,2,2-trichloroethane sulfenamide | 32.76 | 34.40 | 9.87 | 10.46 | |
| N-m-trifluoromethylphenyl-trichloromethylthio sulfenamide | 31.04 | 31.42 | 18.71 | 18.45 | |

*Meq./g.

These unique sulfenamides may be used in toxic amounts to control or kill various pests, particularly fungi. The N-cyano- and nitrophenyl-1,2,2,2-tetrachloroethyl sulfenamides of this invention show excellent activity as ovicides, particularly as applied to acarid eggs such as two-spotted mite eggs.

Sulfenamides of this invention were tested for fungitoxicity by "The Standard Spore-Slide Germination Method for Determining Fungicidal Activity," described in the American Phytopathological Society Journal, vol. 33, pages 627–632 (1943). This method measures the fungitoxicity of compounds in terms of their percent inhibition of fungus spores. The general procedure was as follows: Each compound to be tested was dissolved in acetone to a concentration of 10 p.p.m. These solutions were then pipetted into the wells of depression slides and allowed to dry. The wells were filled with a spore suspension of the specified test organism and incubated in a moist chamber overnight. A group of 100 spores was examined and the number of spores germinated and not germinated was counted and recorded to show the biological activity in terms of the percentage germination inhibition. Table II reports the results of this testing.

TABLE II

| Compound | Percent inhibition | | |
|---|---|---|---|
| | Monilinia fructicola | Alternaria solani | Fusarium solani |
| N-p-nitrophenyl-1,1,2,2-tetrachloroethane sulfenamide | 100 | 100 | |
| N-p-nitrophenyl-trichloromethane sulfenamide | 98 | | 100 |
| N-m-nitrophenyl-1,1,2,2-tetrachloroethane sulfenamide | | 22 | 97 |
| N-p-cyanophenyl-1,1,2,2-tetrachloroethane sulfenamide | 61 | 22 | 90 |
| N-p-cyanophenyl-trichloromethane sulfenamide | | 78 | 78 |
| N-m-nitrophenyl-trichloromethane sulfenamide | 100 | 90 | 100 |
| N-m-nitrophenyl-trichlorovinyl sulfenamide | 97 | 22 | 100 |
| N-p-cyanophenyl-pentachloroethane sulfenamide | 100 | | 97 |
| N-m-nitrophenyl-1,2,2,2-tetrachloroethane sulfenamide | 100 | 97 | 100 |
| N-p-nitrophenyl-1,2,2,2-tetrachloroethane sulfenamide | 100 | 100 | 100 |
| N-p-cyanophenyl-1,2,2,2-tetrachloroethane sulfenamide | 98 | 90 | 98 |
| N-(2-methyl-4-nitrophenyl)-1,1,2,2-tetrachloroethane sulfenamide | 100 | 100 | |
| N-(2-methyl-5-nitrophenyl)-1,2,2,2-tetrachloroethane sulfenamide | 97 | 100 | |
| N-(2-methyl-5-nitrophenyl)-trichloromethane sulfenamide | 100 | | |
| N-p-nitrophenyl-trichloromethane thiosulfenamide | 100 | | |
| N-m-nitrophenyl-trichloromethane thiosulfenamide | 100 | | |
| N-p-cyanophenyl-trichloromethane thiosulfenamide | 100 | 100 | |
| N-m-nitrophenyl-1-chloro-1-nitroethane sulfenamide | | | 61 |
| N-0-trifluoromethylphenyl-1,2,2,2-tetrachloroethane sulfenamide | | 100 | |
| N-p-trifluoromethylpenyl-1,2,2-trichloroethane sulfenamide | 100 | | |
| N-0-trifluoromethylphenyl-1,2,2-trichloroethane sulfenamide | 97 | 100 | |

Ovicidal activity was tested using two-spotted mite (*Tetranychus telarius* L.) eggs on Ford Hook lima bean plants. The procedure was as follows: The sulfenamide to be tested was dissolved in acetone and water to a 100 p.p.m. concentration. Replicate lima bean leaves on which mites had laid eggs were dipped in the sulfenamide solution and then placed in an incubator at about 75° F. After two weeks the eggs, including shells of hatched eggs and dead eggs, were counted. Ovicidal activity expressed as percent inhibition was determined from the number of dead eggs compared to the total number of eggs counted. Table III reports the results of these tests on certain sulfenamides of this invention.

TABLE III

| Compound | Percent inhibition |
|---|---|
| N-m-nitrophenyl-1,2,2,2-tetrachloroethane sulfenamide | 70 |
| N-p-nitrophenyl-1,2,2,2-tetrachloroethane sulfenamid | 100 |
| N-p-cyanophenyl-1,2,2,2-tetrachloroethane sulfenamide | 85 |

Aside from formulating and applying the sulfenamides as described above, they may be dispersed in or on other liquid and solid carriers such as inert clay, petroleum solvents and the like. The solid carrier may be a dust, wettable powder or pellet. And, these compounds may be formulated alone or together with other compatible pesticides, dispersing agents or other adjuvants.

As fungicides, these sulfenamides may be applied in fungitoxic amounts to any environmental area which hosts or is subject to attack from fungi such as, for example, those previously mentioned and *Helminthosporium sativum, Pythium ultimum, Rhizoctonia solani, F. phaseoli* and the like. The fungicidal compositions may be sprayed or otherwise applied to a plant, plant seed, other host or soil.

I claim:
1. A compound having the formula

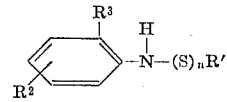

wherein $R^2$ is a cyano or nitro group in the para or meta position or a trifluoromethyl group, $R^3$ is hydrogen or alkyl of 1 to 3 carbon atoms when $R^2$ is cyano or nitro and $R^3$ is hydrogen when $R^2$ is trifluoromethyl, $R'$ is a polyhaloethyl group having 3 to 5 halogens of atomic number 17 to 35, at least one of the halogens being bonded to the α carbon atom, a polyhalovinyl group wherein the halogens are of atomic number 17 to 35 or a 1-halo-1-nitroalkyl group having 2 to 4 carbon atoms wherein the halogen has an atomic number of 17 to 35 and $n$ is 1 or 2 when $R'$ is said polyhaloethyl group and $n$ is 1 when $R'$ is said 1-halo-1-nitroalkyl group or said polyhalovinyl group.

2. A compound of claim 1 wherein $R^3$ is hydrogen.
3. A compound of claim 1 wherein $n$ is 1 when $R'$ is said polyhaloethyl group.
4. The compound of claim 1 wherein $R^3$ is hydrogen, $R^2$ is a nitro group in the para position and $R'$ is 1,2,2,2-tetrachloroethyl and $n$ is 1.

References Cited

Goerdeler et al., Berichte, vol. 95, pp. 1640–41 (1962).

HENRY R. JILES, Primary Examiner

H. I. MONTZ, Assistant Examiner

U.S. Cl. X.R.

424—320